(12) United States Patent
Yang et al.

(10) Patent No.: US 7,733,842 B2
(45) Date of Patent: Jun. 8, 2010

(54) DYNAMIC BEACONING IN WIRELESS MESH NETWORKS

(75) Inventors: Liuyang Lily Yang, Portland, OR (US); Bahareh Sadeghi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 11/303,164

(22) Filed: Dec. 15, 2005

(65) Prior Publication Data
US 2007/0140279 A1 Jun. 21, 2007

(51) Int. Cl.
*H04J 3/06* (2006.01)
*H04L 12/28* (2006.01)
*H04L 12/56* (2006.01)
*H04B 7/00* (2006.01)
*H04B 15/00* (2006.01)

(52) U.S. Cl. .................. 370/350; 370/254; 370/406; 370/503; 455/502

(58) Field of Classification Search .................. 370/254
See application file for complete search history.

(56) References Cited

U.S. PATENT DOCUMENTS

| 7,606,175 | B1* | 10/2009 | Maufer | 370/255 |
| 2003/0128690 | A1* | 7/2003 | Elliott et al. | 370/351 |
| 2004/0264425 | A1* | 12/2004 | Nishikawa | 370/338 |
| 2005/0249167 | A1* | 11/2005 | Salokannel | 370/336 |
| 2005/0265306 | A1 | 12/2005 | Schrum, Jr. et al. | |
| 2006/0068820 | A1* | 3/2006 | Sugaya et al. | 455/512 |
| 2006/0268804 | A1* | 11/2006 | Kim et al. | 370/338 |
| 2007/0014269 | A1* | 1/2007 | Sherman et al. | 370/338 |
| 2009/0092115 | A1* | 4/2009 | Zuniga | 370/338 |

FOREIGN PATENT DOCUMENTS

WO    WO 2005/076543 A    8/2005

OTHER PUBLICATIONS

International Search Report from PCT/US2006/047099, Date Mailed Jun. 29, 2007.
Guido R Hiertz et al, "Mesh Networks Alliance (MNA) Proposal IEEE 802.11s—MAC Sublayer functional Description IEEE 802.11s—Mesh WLAN Security" Internet Citation, May 2005 XP007901169.

* cited by examiner

*Primary Examiner*—William Trost, IV
*Assistant Examiner*—Andrew Chriss
(74) *Attorney, Agent, or Firm*—Pearl Cohen Zedek Latzer, LLP

(57) ABSTRACT

A method, apparatus and system for communicating in a wireless mesh network may relate to a mesh point observing beacon transmissions of one or more neighboring mesh points and dynamically determining if and when to transmit its own beacon based on these observations. Determining when to transmit the beacon may be performed without time synchronization between the one or more neighboring mesh points and be dynamically selected based on the observed transmission time pattern of the neighboring mesh points. Various additional details and embodiments are also disclosed.

15 Claims, 4 Drawing Sheets

DYNAMIC BEACONING IN WIRELESS MESH NETWORKS

BACKGROUND OF THE INVENTION

It is becoming increasingly attractive to use nodes in a wireless network as relaying points to extend range and/or increase power efficiency of wireless transmissions. For example, in a wireless local area network (WLAN), network devices may be configured to receive and forward communications which are ultimately destined for a different device. These types of networks are generically referred to as "mesh" networks, where network nodes may form a "mesh" of paths for which communications may travel to reach their destination.

Wireless networks may use beacon transmissions to advertise the network's existence, as well as provide information about the network and capabilities associated with the network.

Various beaconing techniques have previously been used in wireless networks. For example, the Institute of Electrical and Electronics Engineers (IEEE) IEEE Std. 802.11-1997 specifies the use of two different kinds of beaconing mechanisms; one for infrastructure mode networks (also called basic service set (BSS) networks) and one for ad-hoc mode networks (also called independent basic service set (IBSS) networks)

In infrastructure networks, access points (APs) are the entities responsible for generating beacons whereas in ad hoc networks all network nodes (including user stations) participate in the generation of beacons. The ad hoc network beacons (referred to as IBSS beacons) are used to advertise the network (which consists of all the nodes) as a whole while the infrastructure network beacons (referred to as BSS beacons) are generated by an AP and meant to advertise the existence of only that individual AP.

While related in general nature to mesh networks, ad hoc networks are not considered mesh networks within the context of this disclosure. Ad hoc networks can fundamentally be considered single hop networks because the network design is predicated on the assumption that all the nodes in the network can hear one another. Conversely, a wireless mesh network, as used herein, is a network capable of multi-hop wireless communications in which one node (or mesh point) may not necessarily hear all other network nodes.

Conventionally, beacon generation in ad hoc networks has been performed by all network stations. For example, each station picks a random delay at the end of a beacon interval and a beacon is sent when a timer expires provided that no other beacon has been transmitted in a current beacon generation window. This conventional mechanism depends on a Time Synchronization Function (TSF) shared between all ad hoc nodes, and which is feasible in a (one-hop) ad hoc network. However, for multi-hop mesh networks in which nodes may not be able to hear all other nodes present in the same network, a centralized TSF used for ad hoc networks cannot be relied on.

Consequently, a beaconing mechanism for wireless mesh networks that does not require time synchronization between nodes is desirable. Further, it would be advantages to have a beaconing mechanism that provides sufficient beacon coverage to facilitate effective mesh discovery via passive scanning by a station at any location within a mesh service area while preferably controlling the bandwidth overhead of beaconing in a dense mesh network.

BRIEF DESCRIPTION OF THE DRAWING

Aspects, features and advantages of embodiments of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to WLANs, the invention is not limited thereto and can be applied to other types of wireless networks where similar advantages may be obtained. Such networks for which inventive embodiments may be applicable specifically include: wireless personal area networks (WPANs), wireless metropolitan area networks (WMANs), and/or wireless wide area networks (WWANs) such as cellular networks and the like. Further, inventive embodiments may be discussed in reference to wireless networks utilizing Orthogonal Frequency Division Multiplexing (OFDM) modulation. However, the embodiments of present invention are not limited thereto and, for example, can be implemented using other modulation and/or coding schemes where suitably applicable.

The following inventive embodiments may be used in a variety of applications including transmitters and receivers of a radio system. Radio systems specifically included within the scope of the present invention include, but are not limited to, network interface cards (NICs), network adaptors, mobile stations, base stations, access points (APs), gateways, bridges, hubs and routers. Further, the radio systems within the scope of the invention may include cellular radiotelephone systems, satellite systems, personal communication systems (PCS), two-way radio systems and two-way pagers as well as computing devices including radio systems such as personal computers (PCs) and related peripherals, personal digital assistants (PDAs), personal computing accessories and all existing and future arising systems which may be related in nature and to which the principles of the inventive embodiments could be suitably applied.

Figure 1:
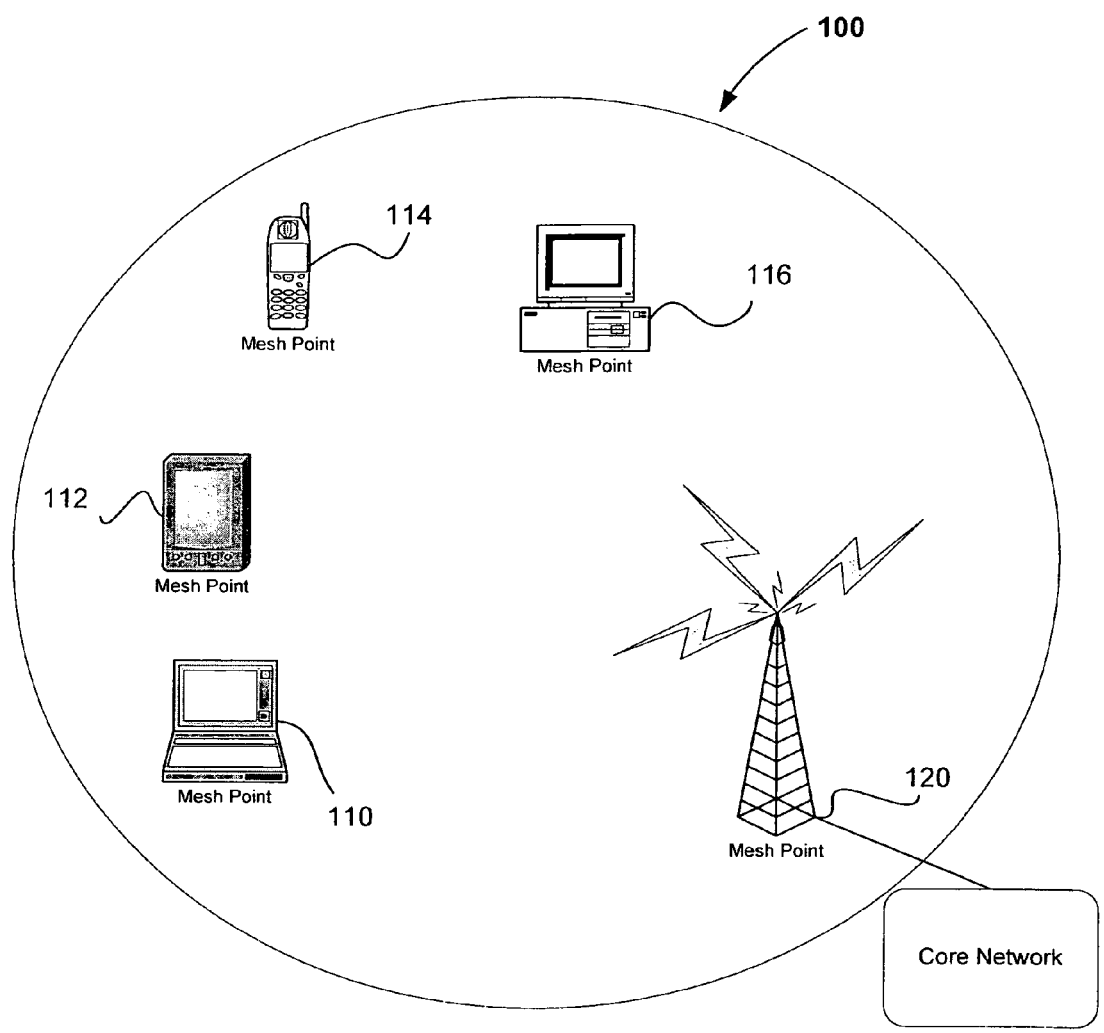
FIG. 1 is a block diagram illustrating an example wireless mesh network according to various embodiments of the present invention.

Turning to FIG. 1, a wireless communication system 100 according to one embodiment of the invention may include one or more user stations 110, 112, 114, 116 and/or one or more central network access stations 120. Stations 110-120 are referred to as mesh points. System 100 may be any type of wireless network such as a WPAN, WLAN, WMAN or WWAN where mesh points 110-116 and/or 120 may communicate with one another via an over-the-air (OTA) interface.

System 100 may further include one or more additional wired or wireless network devices as desired. In certain embodiments system 100 may communicate via an air interface utilizing multi-carrier modulation such as OFDM and/or OFDMA although the inventive embodiments are not limited in this respect.

Mesh points 110-120 may be devices capable of using protocols compatible with one or more of various IEEE 802 wireless standards including for example, 802.15 (a), (b), (g) and/or (n) standards for WLANs, 802.15 standards for WPANs, and/or 802.16 standards for WMANs, although any protocols for communicating via an air interface could be used.

A mesh beacon mechanism may be used in mesh points 110-120 so new devices within range of network 100 can discover the network. However, in a dense mesh network not every mesh point need always send a beacon because the beacons in a mesh network are meant to advertise the existence of the network as a whole rather than identifying each individual node. Additionally, it is usually desirable to reduce the network overhead which may be consumed by unnecessary transmissions in any network.

According to certain embodiments of the present invention, the decision of which mesh points 110-120 should beacon during a given beacon interval may be made considering two basic objectives: (i) to ensure sufficient beacon coverage to facilitate mesh network discovery via passive scanning by a station in range; and (ii) to control the bandwidth overhead consumed by excessive beaconing.

These two objectives, however, impose opposing requirements on the number of mesh points participating in beacon process. For example, while objective (i) is achieved with participation of more nodes, objective (ii) is achieved by limiting the number of nodes that transmit beacons. Thus, a desirable beacon performance can be achieved by balancing these two objectives.

Figure 2:
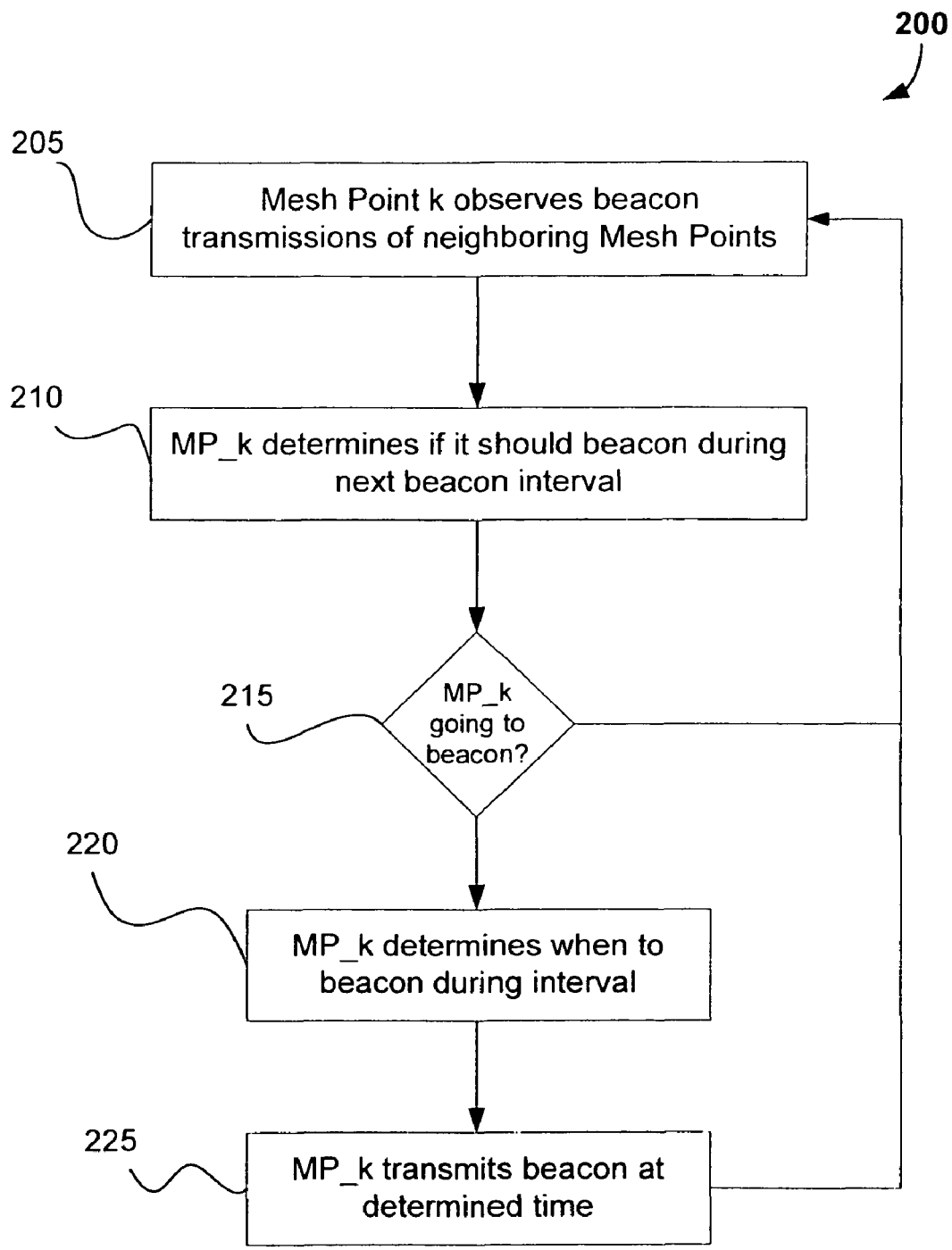
FIG. 2 is a flow diagram showing a process for dynamic beaconing in a wireless mesh network according to one embodiment of the present invention.

Turning to FIG. 2, a method 200 for beaconing in a mesh network according one embodiment of the present invention may generally include a mesh point (for example any of mesh points 110-120; FIG. 1) observing 205 beacon transmissions, if any, from one or more neighboring mesh points and determining 210 if the mesh point should beacon at all during a beacon interval based on the observations. If 215 the mesh point determines it should beacon, the mesh point may then determine 220 at what instant during the beacon interval it should beacon and then transmit 225 a beacon at that time. In this manner, each mesh point may dynamically determine on its own if and when to beacon using its own local clock and not require any centralized network time synchronization function.

In the example implementation described below, the terms are intended to have the following meanings:

The following are the constants defined for a given mesh network:

MeshID is the ID (string) used to identify a particular mesh network;

Tscan is the time interval that a Mesh Point may scan and listen for mesh beacons on each channel before it switches to another channel;

T is the fixed Beacon Interval that all the Mesh Points adopt to use in a particular Mesh network (identified by a particular MeshID). For example, if a mesh point sends its own beacon, it should send one beacon in every T time units;

Tmin and Tmax are two beacon thresholds (in time units) where Tmin=< Tmax and Tmin is a minimum desired time between two consecutive mesh beacon and Tmax is a maximum desired time between two consecutive mesh beacons.

Pmin is a minimum probability with which a mesh point will generate a mesh beacon.

$\Delta P$ is a linear adjustment value that is applied to a probability (P) of a mesh point (MP) beaconing every time an adjustment is deemed necessary.

(The optimum values for these parameters can be selected as desired, for example considering such factors as network performance and/or equipment utilized).

The following are the variables that each mesh point may track:

MP_k is an identifier for Mesh Point k.

Imax(MP_k) is a longest interval of silence that Mesh Point k can observe between two Mesh Beacons sent by other mesh points in a T interval in the same mesh network (with the same MeshID)

P(MP_k) is a probability with which Mesh Point k will generate a mesh beacon.

Observing 205 beacon transmissions of neighboring nodes can be performed in a variety of manners. In one embodiment, a mesh point may scan and/or listen for mesh beacons for a period of time (Tscan), for example on each channel before it switches to another channel. Each new mesh point, upon activation, may scan for duration Tscan to learn about existing mesh points (if any), their MeshIDs and the beacon interval (T) advertised in the mesh beacons. If a new mesh point does not hear any beacons during Tscan, it may pick its own beacon interval T (e.g., T<Tscan) and may start sending 225 its own periodic beacon once every T.

If a new mesh point does hear other mesh beacons from a mesh network it wants to join, it may first initiate a mesh association process (not relevant to the scope of this disclosure) and identify a beacon transmission time pattern (BTTP) of the network beacons during a first beacon interval (e.g., duration T). The longest interval of silence (Imax) that mesh point k (MP_k) observes between two mesh beacons can be derived from the BTTP, examples of which are discussed further in reference to FIGS. 3 and 4 below.

Determining 210 whether the mesh point should beacon can be performed in a variety of different ways. In one embodiment, mesh point k may use the BTTP to determine a probability P(MP_k) of sending a mesh beacon during the next beacon interval T.

For example, in one embodiment the probability P(MP_k) may be set to 1 when mesh point MP_k initially joins the network (i.e., new mesh points will always generate a beacon when entering the network). The probability P(MP_k) of subsequent beaconing may be adjusted upward or downward by $\Delta P$ from its last value depending on the BTTP and the longest interval of silence observed Imax(MP_k). In one example implementation to which the inventive embodiments are not limited, the probability of beaconing P(MP_k) can be adjusted based on the following equations:

(1) If Imax(MP_k)>Tmax, the P(MP_k)=min(1, P(MP_k)+$\Delta P$);

(2) If Imax(MP_k)<Tmin, then P(MP_k)=max(Pmin, P(MP_k)−$\Delta P$);

(3) Otherwise, P(MP_k) remains unchanged.

The adjustment of beacon probability P(MP_k) in equation 1 means that mesh point k would increase its probability of generating a beacon because the silence period between two beacons (from other mesh points) is greater than a desired maximum threshold (Tmax). Equation 1 works to ensure there is sufficient mesh beacon coverage at any location within a mesh service area.

Conversely, the adjustment in equation 2 means that the mesh point should decrease its probability of sending a beacon because intervals between network beacons are shorter than a desired minimum threshold (Tmin). This equation helps control the beacon overhead when the network becomes too dense and there are too many beacons being generated by other mesh points.

In one embodiment, when a probability of beaconing P(MP_k) has been determined for a particular beacon interval T, a random number between 0 and 1 can be generated and compared with the determined probability P(MP_k), although the inventive embodiments are not limited in this respect. If the random number is greater than P(MP_k) then mesh point k determines 210 that it should generate its own beacon; otherwise, it should not.

If 215, it is determined mesh point k should generate its own beacon during the next beacon interval T and it has transmitted a beacon during the previous beacon interval, in one embodiment, mesh point k may transmit 225 a beacon T time units after its previous beacon transmission.

However, if 215 it is determined that mesh point k should generate its own beacon during the next beacon interval and it did not beacon during the previous beacon interval, mesh point k should determine 220 when it should transmit the beacon. In one embodiment, referring to FIGS. 3 and 4, this may be performed by examining the beacon transmissions of other network nodes (e.g., MP_1, MP_2, MP_3), for example, from the BTTP 300.

Figure 3:
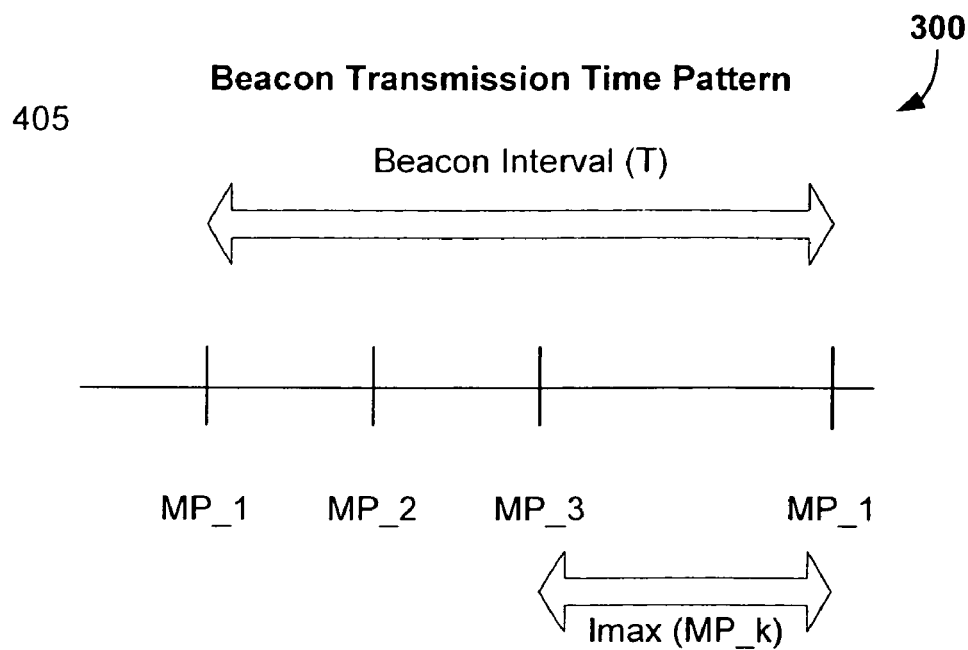
FIGS. 3 and 4 are sequence diagrams showing respective beacon transmission timing patterns (BTTPs) according to various embodiments.

In FIG. 3, mesh point k can observe that the largest interval (e.g. Imax(MP_k)) between consecutive beacons during a beacon interval T occurs between the beacon from mesh point MP_3 and the next beacon from mesh point MP_1. Therefore, mesh point k determines 220 that its own beacon should be transmitted at some point between the beacon from MP_3 and MP_1 and transmits 225 its own beacon at this time.

Figure 4:
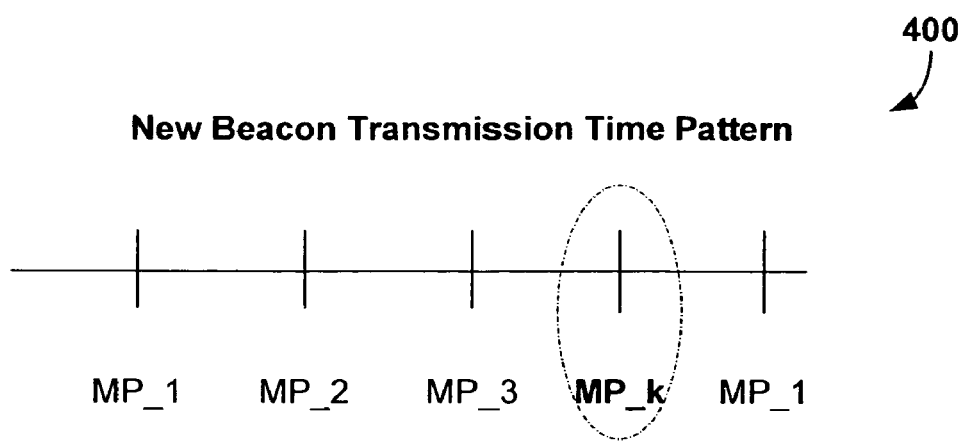

An updated beacon transmission time pattern 400 is shown in FIG. 4 where mesh point MP_k has inserted a beacon between the beacons from MP_3 and MP_1. It should be recognized that FIGS. 3 and 4 represent only simplified example illustrations of BTTPs and that actual BTTPs may be much more complex and/or include many more beacons from neighboring mesh points.

In various embodiments, as in infrastructure mode or ad hoc mode networks for conventional WLANs, mesh beacon transmissions may follow the basic media access mechanism including proper carrier sensing and backoff mechanisms. The inventive embodiments may thus help ensure that it is unlikely for two hidden mesh points to have repetitive collisions on their mesh beacons, because the random backoff adds randomness to the actual beacon transmission time. Moreover, in certain embodiments, if a mesh point hears a beacon transmission near or when it is scheduled to beacon, it may defer from transmitting a beacon at that beacon interval.

Figure 5:
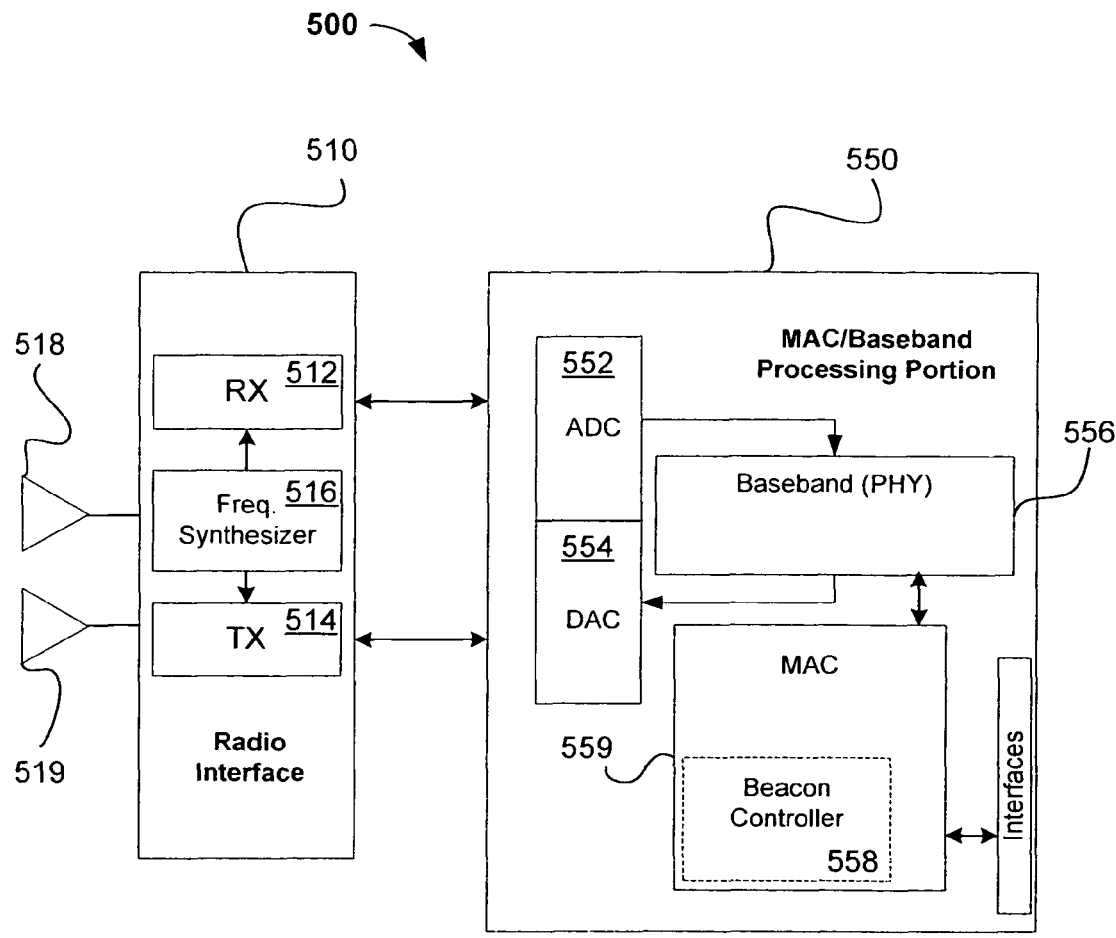
FIG. 5 is a block diagram showing an example wireless apparatus according to various aspects of the invention.

Referring to FIG. 5, an apparatus 500 for use in a wireless mesh network may include a processing circuit 550 including logic (e.g., circuitry, processor(s) and software, or combination thereof) to dynamically determine if an when to transmit mesh beacons as described in one or more of the processes above. In certain embodiments, apparatus 500 may generally include a radio frequency (RF) interface 510 and a baseband and MAC processor portion 550.

In one example embodiment, RF interface 510 may be any component or combination of components adapted to send and receive modulated signals (e.g., OFDM) although the inventive embodiments are not limited to any particular modulation scheme. RF interface 510 may include, for example, a receiver 512, a transmitter 514 and a frequency synthesizer 516. Interface 510 may also include bias controls, a crystal oscillator and/or one or more antennas 518, 519 if desired. Furthermore, RF interface 510 may alternatively or additionally use external voltage-controlled oscillators (VCOs), surface acoustic wave filters, intermediate frequency (IF) filters and/or radio frequency (RF) filters as desired. Various RF interface designs and their operation are known in the art and the description for configuration thereof is therefore omitted.

In some embodiments interface 510 may be configured to provide OTA link access which is compatible with one or more of the IEEE standards for WPANs, WLANs, WMANs or WWANs, although the embodiments are not limited in this respect.

Processing portion 550 may communicate/cooperate with RF interface 510 to process receive/transmit signals and may include, by way of example only, an analog-to-digital converter 552 for down converting received signals, a digital-to-analog converter 554 for up converting signals for transmission, and a baseband processor 556 for physical (PHY) link layer processing of respective receive/transmit signals. Processing portion 550 may also include or be comprised of a processing circuit 559 for MAC/data link layer processing.

In certain embodiments of the present invention, MAC circuit 559 may include a dynamic beacon controller 558 which may function to control mesh node beacons as described previously. Alternatively or in addition, PHY circuit 556 may share processing for certain of these functions or perform these processes independent of MAC processor 559. MAC and PHY processing may also be integrated into a single circuit if desired.

Apparatus 500 may be, for example, a mobile station, a wireless base station or AP, wireless router and/or a network adaptor for electronic devices. Accordingly, the previously described functions and/or specific configurations of apparatus 500 could be included or omitted as suitably desired.

Embodiments of apparatus 500 may be implemented using single input single output (SISO) architectures. However, as shown in FIG. 5, certain implementations may use multiple input multiple output (MIMO) architectures having multiple antennas (e.g., 518, 519) for transmission and/or reception. Further, embodiments of the invention may utilize multi-carrier code division multiplexing (MC-CDMA) multi-carrier direct sequence code division multiplexing (MC-DS-CDMA) for OTA link access or any other existing or future arising modulation or multiplexing scheme compatible with the features of the inventive embodiments.

The components and features of apparatus 500 may be implemented using any combination of discrete circuitry, application specific integrated circuits (ASICs), logic gates and/or single chip architectures. Further, the features of apparatus 500 may be implemented using microcontrollers, programmable logic arrays and/or microprocessors or any combination of the foregoing where suitably appropriate (collectively or individually referred to as "logic").

It should be appreciated that the example apparatus 500 represents only one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments of the present invention.

Unless contrary to physical possibility, the inventors envision the methods described herein: (i) may be performed in any sequence and/or in any combination; and (ii) the components of respective embodiments may be combined in any manner.

Although there have been described example embodiments of this novel invention, many variations and modifications are possible without departing from the scope of the invention. Accordingly the inventive embodiments are not limited by the specific disclosure above, but rather should be limited only by the scope of the appended claims and their legal equivalents.

The invention claimed is:

1. A method of transmitting a beacon by a mesh point in a wireless mesh network, the method comprising:
    setting a value of a probability of subsequent beaconing P to 1 by generating a beacon when entering the wireless mesh network;
    adjusting the probability of subsequent beaconing P value by applying a linear adjustment value ($\Delta P$);
    dynamically determining the value of the probability of subsequent beaconing P in order to transmit the beacon during a next beacon interval based on the observations of a longest interval of silence (Imax) between two beacon intervals of one or more neighboring mesh points;
    comparing a random number to the probability of subsequent beaconing P value; and
    transmitting the beacon based on the comparison.

2. The method of claim 1 comprising:
    transmitting the beacon without dependence on time synchronization between the one or more neighboring mesh points.

3. The method of claim 1 wherein adjusting comprises:
    increasing the value of the probability of subsequent beaconing P if an observed silence period between two beacons is greater then a desired maximum threshold (Tmax).

4. The method of claim 3 wherein adjusting comprises:
    decreasing the value of the probability of subsequent beaconing P if an observed silence period between two beacons is shorter then a desired minimum threshold (Tmin).

5. The method of claim 1 wherein the wireless mesh network comprises one of a wireless local area network (WLAN), a wireless personal area network (WPAN) or a wireless metropolitan area network (WMAN).

6. A wireless device comprising:
    a medium access control (MAC) circuit to set a value of a probability of subsequent beaconing P to 1 by generating a beacon when entering the wireless mesh network, to adjust the probability of subsequent beaconing P value by applying a linear adjustment value ($\Delta P$); and
    a dynamic beacon controller to dynamically determine the probability to transmit the beacon during a next beacon interval based on observations of a longest interval of silence (Imax) between two beacon intervals of one or more neighboring mesh points and to compare a random number to value of the probability of subsequent beaconing P; and
    a transmitter to transmit the beacon on a beacon interval based on the comparison.

7. The wireless device of claim 6 wherein medium access control (MAC) circuit is to calculate the value of the probability of subsequent beaconing P based, at least in part, on a number of beacons being transmitted by the one or more neighboring wireless mesh points in a given amount of time.

8. The wireless device of claim 6 wherein the medium access control (MAC) circuit is able to increase the value of the probability of subsequent beaconing P if an observed silence period between two beacons is greater then a desired maximum threshold (Tmax) and to decrease the probability subsequent beaconing P value if the observed silence period between the two beacons is shorter then a desired minimum threshold (Tmin) and to dynamically determine when to transmit its own beacon by selecting a time between two consecutive beacons generated by the one or more neighboring wireless mesh points with a longest interval in between.

9. The wireless device of claim 6 wherein the device comprises a mobile station.

10. The wireless device of claim 6 wherein the device comprises a network access station.

11. A system for use in a wireless mesh network, the system comprising:
    a medium access control (MAC) circuit to set a probability of subsequent beaconing P value to 1 by generating a beacon when entering the wireless mesh network,
    to adjust a value of a probability of subsequent beaconing P by applying a linear adjustment value ($\Delta P$);
    a dynamic beacon controller to dynamically determine a value of the probability of subsequent beaconing P in order to transmit the beacon during a next beacon interval based on observations of a longest interval of silence (Imax) between two beacon intervals of one or more neighboring mesh points and to compare a random number to the value of the probability of subsequent beaconing P;
    a radio frequency (RF) interface communicatively coupled to the processing circuit, said RF interface including a transmitter to transmit a beacon based on the determined beacon transmission time pattern; and
    at least one antenna coupled to the RF interface.

12. The system of claim 11 wherein said dynamic beacon controller is to dynamically determine when to transmit the beacon is without dependence on time synchronization between the one or more neighboring mesh points.

13. The system of claim 11 wherein the medium access control (MAC) circuit is able to increase the probability of the value of the subsequent beaconing P if an observed silence period between two beacons is greater then a desired maximum threshold (Tmax) and to decrease the probability of subsequent beaconing P value if the observed silence period between the two beacons is shorter then a desired minimum threshold (Tmin) and to dynamically determine whether to transmit the beacon based on the probability.

14. The system of claim 11 wherein the wireless mesh network comprises one of a wireless local area network (WLAN), a wireless personal area network (WPAN) or a wireless metropolitan area network (WMAN).

15. The system of claim 11 wherein the system comprises a mobile station.

* * * * *